United States Patent
Koat et al.

(10) Patent No.: US 10,862,711 B2
(45) Date of Patent: Dec. 8, 2020

(54) SYSTEM AND METHOD FOR DYNAMIC NETWORK FUNCTION VIRTUALIZATION PROCESSING

(71) Applicant: Incognito Software Systems Inc., Vancouver (CA)

(72) Inventors: Peter Koat, Vancouver (CA); Christopher Busch, Arnprior (CA)

(73) Assignee: Incognito Software Systems Inc., Vancouver (CA)

( * ) Notice: Subject to any disclaimer, the term of this patent is extended or adjusted under 35 U.S.C. 154(b) by 0 days.

(21) Appl. No.: 16/468,610

(22) PCT Filed: Dec. 14, 2016

(86) PCT No.: PCT/CA2016/051471
§ 371 (c)(1),
(2) Date: Jun. 11, 2019

(87) PCT Pub. No.: WO2018/107262
PCT Pub. Date: Jun. 21, 2018

(65) Prior Publication Data
US 2020/0014561 A1 Jan. 9, 2020

(51) Int. Cl.
*G06F 15/173* (2006.01)
*H04L 12/66* (2006.01)
(Continued)

(52) U.S. Cl.
CPC .......... *H04L 12/66* (2013.01); *G06F 9/45558* (2013.01); *H04L 45/745* (2013.01);
(Continued)

(58) Field of Classification Search
CPC ... H04L 12/66; H04L 45/745; H04L 63/0892; H04L 67/16; H04L 69/22; G06F 9/45558; G06F 2009/45595
(Continued)

(56) References Cited

U.S. PATENT DOCUMENTS

| | | | | |
|---|---|---|---|---|
| 2012/0281540 A1* | 11/2012 | Khan | .................. | H04W 40/00 370/241 |
| 2015/0237519 A1 | 8/2015 | Ghai | | |
| 2015/0334595 A1* | 11/2015 | Bosch | .................. | H04L 29/06 370/235 |

OTHER PUBLICATIONS

Maglione, R. et al., "Radius Attributes for NSH draft-maglione-sfc-nsh-radius-00", sfc Internet-Draft, available for download at https://tools.ietf.org/html/draft-maglione-sfc-nsh-radius-00, dated Oct. 15, 2016.

(Continued)

*Primary Examiner* — Atta Khan
(74) *Attorney, Agent, or Firm* — Warner Norcross + Judd LLP

(57) ABSTRACT

A system leveraging the authentication control plane of a communications network to influence the associated Network Service header (NSH) values on a per subscriber packet basis; thus presenting a subscriber aware service chain header on which influences the processing of virtualized network function (VNF). This system implements vendor specific attributes (VSA) within the authentication provider platform to create an association of subscriber identity which may include MAC address, MAC and IP address as a tuple, circuit identifier string, realm based authentication data, IMSI, in part or in addition to leveraging DHCP Relay information sub options that may be present, which when processed inherit one or multiple vendor specific attributes from the authentication platform. These VSA values, each no greater than 2 bytes define the payload headers the participating subscriber gateway will shim to its layer 2 payload for processing as a Service Chain through one or multiple virtual network functions located elsewhere in the network.

20 Claims, 6 Drawing Sheets

(51) Int. Cl.
    *G06F 9/455*         (2018.01)
    *H04L 12/741*      (2013.01)
    *H04L 29/06*        (2006.01)
    *H04L 29/08*        (2006.01)

(52) U.S. Cl.
    CPC .......... *H04L 63/0892* (2013.01); *H04L 67/16* (2013.01); *H04L 69/22* (2013.01); *G06F 2009/45595* (2013.01)

(58) Field of Classification Search
    USPC ........................................................ 709/225
    See application file for complete search history.

(56) References Cited

OTHER PUBLICATIONS

Raina, K, et al., "Security Position Paper Network Function Virtualization", Cloud Security Alliance, available for download at https://downloads.cloudsecurityalliance.org/assets/research/virtualization/Security_Position_Paper-Network_Function_Virtualization.pdf, published Feb. 29, 2016.

"Radius Vendor-Specific Attributes (VSA)", Cisco IOS Security Configuration Guide, available for download at https://www.cisco.com/c/en/us/td/docs/ios/12_2/security/configuration/guide/fsecur_c/scfrdat3.pdf, available at least as of Dec. 14, 2016.

\* cited by examiner

| Code | Attributes |
|---|---|
| 1 | User-Name |
| 2 | User-Password |
| 3 | CHAP-Password |
| 4 | NAS-IP-Address |
| 5 | NAS-Port |
| 6 | Service-Type |
| 7 | Framed-Protocol |
| 8 | Framed-IP-Address |
| 9 | Framed-IP-Netmask |
| 10 | Framed-Routing |
| 11 | Filter-Id |
| 12 | Framed-MTU |
| 13 | Framed-Compression |
| 14 | Login-IP-Host |
| 15 | Login-Service |
| 16 | Login-TCP-Port |
| 17 | (unassigned) |
| 18 | Reply-Message |
| 19 | Callback-Number |
| 20 | Callback-Id |
| 21 | (unassigned) |
| 22 | Framed-Route |
| 23 | Framed-IPX-Network |
| 24 | State |
| 25 | Class |
| 26 | Vendor-Specific |
| 27 | Session-Timeout |
| 28 | Idle-Timeout |
| 29 | Termination-Action |
| 30 | Called-Station-Id |
| 31 | Calling-Station-Id |
| 32 | NAS-Identifier |
| 33 | Proxy-State |
| 34 | Login-LAT-Service |
| 35 | Login-LAT-Node |
| 36 | Login-LAT-Group |
| 37 | Framed-AppleTalk-Link |
| 38 | Framed-AppleTalk-Network |
| 39 | Framed-AppleTalk-Zone |
| 40-59 | (reserved for accounting) |
| 60 | CHAP-Challenge |
| 61 | NAS-Port-Type |
| 62 | Port-Limit |
| 63 | Login-LAT-Port |

FIG. 4

SYSTEM AND METHOD FOR DYNAMIC NETWORK FUNCTION VIRTUALIZATION PROCESSING

TECHNICAL FIELD

The invention relates generally to the field of virtualizing network functions, and more particularly to a system and method for implicit processing of packet payloads in a virtualized network function environment.

BACKGROUND OF THE INVENTION

Customer premises equipment (CPE) refers generally to any device or equipment located at a subscriber's premises and connected with a service provider's communications network. Generally, the CPE is also connected to a local area network at the customer premises and is network connected in some form or another. For example, CPE devices could include telephones, routers, switches, gateways, cable set-top boxes, networking adaptors, internet access gateways. In the case where the CPE device is a gateway, the gateway itself may be provided or provisioned by a particular supplier whereas the CPE devices behind the gateway are typically user-purchased devices that serve a particular purpose at premises. Telephones are an example of these user-purchased devices. Gateways are sometimes user purchased, but could also be made a requirement by an internet or cable service provider.

CPE devices have grown more and more sophisticated over the years, evolving from an Ethernet access device to advanced gateway devices with Wi-Fi capabilities, multiple network ports, firewall, and DHCP capabilities, for example. Development in the art is also fast moving and there are routinely new CPEs released which support existing and new capabilities such as IOT gateway. For practical and business reasons, legacy devices are not upgraded, in part due to their inability to support the corresponding increased demands in computing power and memory that the new capabilities require. In some instances, new functionality is added to support CPEs through firmware upgrades if the device is able to support it and there are sound business reasons for adding capabilities to non-end-of-life devices.

There is also a trend in the communications art known as network function virtualization, which aims to virtualize network functions such as firewall rules that were previously provided by proprietary hardware devices or software implemented on hardware devices, in effect seeking to decouple hardware from software. This is often implemented by providing a software stack augmented to provide the same level of functionality that the traditional hardware device could deliver. Such hardware devices typically had this functionality programmed on an ASIC or embedded in a system-on-a-chip stack. The software stack in a virtualized scenario is run on a commercial off the shelf systems (COTS), which in turn could be virtualized in a cloud environment to provide the virtualized networked service. While virtualization of network functions is applicable to many types of services, examples in the delivery of internet or cable services to a number of home customers include the provision of parental controls, time blocking, quota enforcement, DLNA server and DHCP functionality.

The general operating conditions in a virtualized environment is to chain the network functions, similarly to the manner in which an operating system processes network traffic at each layer of the Open System Interconnection model. In many instances, parallel processing may not be possible and thus sequential (or chained) processing of virtualized network functions is the normal operating protocol, where the packet payloads related to each virtualized network function are processed based on some a priori ranking.

As each customer, or even each hardware device whose functions are virtualized, has unique requirements and potentially different services being subscribed to, an orchestrator is required to generate a large number of unique control path permutations based on each a subscribers attributes. The orchestrator is a known prior art device, typically implemented on a server which makes decisions on the processing of each payload for each virtualized network function.

This creates a significant overhead for the orchestrator; requiring the orchestrator to either be prepopulated with the necessary details of every subscriber before their gateway (or the hardware customer premises equipment) attempts to establish a connection with the virtual counterpart, the vCPE, resulting in significant memory/storage and synchronization of requirements with only a subset being used in each instance; or the orchestrator will need to make API calls to AAA, LDAP, DB or OSS subscriber management systems, resulting in latency and ultimately unnecessary performance slowdowns. Ultimately, these approaches require large amounts of storage/memory for the orchestrator, or affect the end-to-end performance.

There is accordingly a need in the art to, in whole or in part, address the issue of an orchestrator requiring details of every subscriber in the virtualized environment or having to make API calls to obtain this information.

SUMMARY OF THE INVENTION

In one embodiment of the invention, there is provided a system for virtualizing network functions including a gateway having a computer processor executing computer readable instructions for sending and receiving data traffic, an authentication server receiving a request for authentication from the gateway based on a subscriber identity and responding to the gateway; the response including data to influence the execution of virtualized network functions and an orchestration server including a computer processor for receiving service requests for virtualized functions from the gateway and invoking at least one requested virtualized function. The system is configured such that the authentication server provides data to the orchestration server relevant to the instantiating of the virtualized network functions and data relevant to the execution of the virtualized network functions; and the orchestration server places the data received from the authentication server into headers of payload data from the gateway such that the payload data contains information required by a virtualized network function server for executing the virtualized network functions based on the instantiating by the orchestration server.

In one aspect of the invention, the authentication server receives data associating subscriber identify with the gateway; wherein the data packets having the header portion conform to a protocol.

In another aspect of the invention, the protocol includes data attributes in the form of a Network Service Header (NSH) that include information used in the forwarding domain to implicitly define the service chain applied against the payload when executing the invoked virtualized network functions.

In another aspect of the invention, the protocol is the RADIUS protocol, and the data fields are behind vendor-defined attribute 26 as Vendor Specific Headers (VSH).

In another aspect of the invention, the authentication server is an authentication, authorization and accounting (AAA) server.

In another aspect of the invention, the virtualized network functions are functions required by the subscriber, regardless of the gateway.

In another aspect of the invention, the gateway is a network access point for providing internet service.

In another aspect of the invention, the orchestration service has no a priori knowledge regarding the subscriber VNF service chain; and thereby routes the payload through the virtualized network functions entirely based on information in the header portion of the data packets.

In another aspect of the invention, the information relevant to the execution of the virtualized network functions is passed on to the virtualized network function server as being relevant only to the invoked virtualized network function.

In another aspect of the invention, the orchestration service reacts to the AAA service authentication of a user and associated identifying attributes selected from circuit ID, MAC and IMSI where the user is routing traffic through, and communicate with the orchestration service to insatiate VNFs based on the vendor-defined attributes 26.

In another embodiment of the invention, there is provided a method for virtualizing network functions including receiving by an orchestration server service requests for virtualized network functions from a gateway and invoking at least one requested virtualized function; executing by a virtualized network function server the virtualized functions based on the invoking by the orchestration server; executing by a authentication platform of vendor specific attributes to influence the values of service chain inheritance per subscriber identity; wherein data packets in the service requests include a header portion; the header portion including information processed by the authentication platform for inserting each subscriber network service header value to forward payloads to the virtualized network functions.

In another aspect of the invention, the method includes receiving by an authentication server data associating subscriber identify with the gateway; wherein the data packets having the header portion conform to a protocol used by the service chain forwarding.

In another aspect of the invention, the protocol includes data attributes in the form of a Network Service Header (NSH) that include information used in the forwarding domain to implicitly define the service chain applied against the payload when executing the invoked virtualized network functions.

In another aspect of the invention, the protocol is the RADIUS protocol, and the data fields are behind vendor-defined attribute 26 as Vendor Specific Headers (VSH).

In another aspect of the invention, the authentication server is an authentication, authorization and accounting (AAA) server.

In another aspect of the invention, the virtualized network functions are functions required by the subscriber, regardless of gateway.

In another aspect of the invention, the gateway is a network access point for providing internet service.

In another aspect of the invention, the orchestration service has no a priori knowledge regarding the subscriber VNF service chain; and thereby routes the payload through the virtualized network functions entirely based on information in the header portion of the data packets.

In another aspect of the invention, the information relevant to the execution of the virtualized network functions is passed on to the virtualized network function server as being relevant only to the invoked virtualized network function.

In another aspect of the invention, the orchestration service will react to the AAA service authentication of a user and associated identifying attributes such as circuit ID, MAC, IMSI where the user is routing traffic through, and communicate with the orchestration service to insatiate as needed any generic or custom VNFs based on the vendor-defined attributes 26.

BRIEF DESCRIPTION OF THE DRAWINGS

Embodiments will now be described, by way of example only, with reference to the attached Figures, wherein:

FIG. 4 is a listing of various RADIUS attributes.

DETAILED DESCRIPTION OF THE EMBODIMENTS

Figure 1:
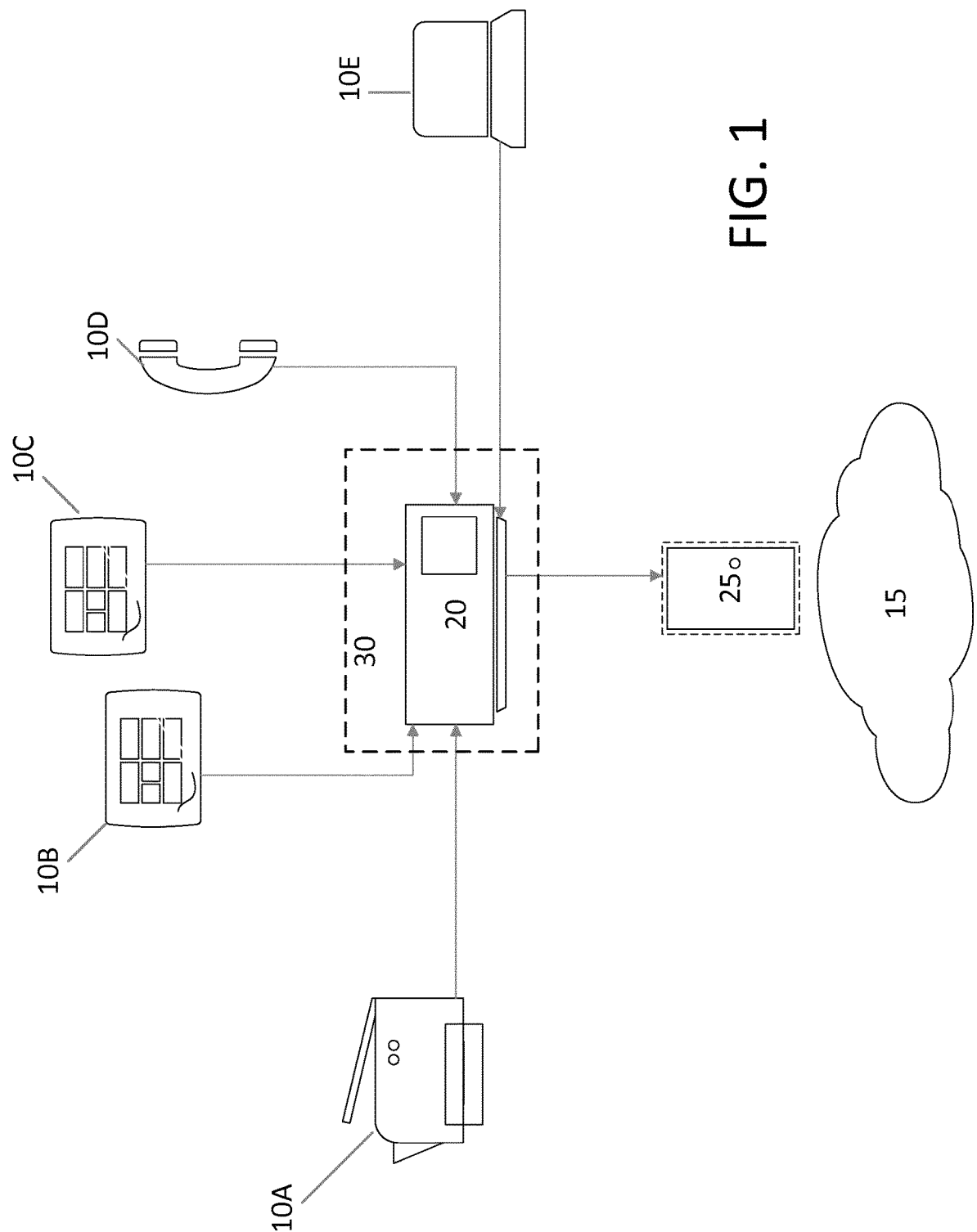
FIG. 1 shows a general system view in which embodiments of the invention may be implemented.

In some embodiments of the invention, there is described a mechanism and system by which a combination an AAA (authentication, authorization and accounting) server is used as a control plane to instruct the execution by an orchestration server of discrete virtualized network functions (VNFs) without requiring a priori knowledge of individual customer of VNF requirements. The system also provides an inherent mechanism to provide garbage collection such that resources are only required for active sessions.

Herein, numerous specific details are set forth in order to provide a thorough understanding of the exemplary embodiments described. However, it will be understood by those of ordinary skilled in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both, unless otherwise stated to the contrary. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Referring now to FIG. 1, there is shown a plurality of end-user devices 10A-10D, at the physical location of a customer. Each of the end-user devices 10A-10D is in communication with an external communications network 15 via a gateway 20, referred to in the alternative as a "customer premises equipment" (CPE) device. A virtual CPE (vCPE) 25 is implemented in software between the gateway 20 either on a separate computer system or as part an enhanced gateway device 30 itself, in such a way to permit the vCPE 25 to read all inbound and outbound data transfer from the gateway 20. In this manner, all data traffic, whether inbound or out-of-band at the gateway is routed through the vCPE 25.

The vCPE provides a cloud, or otherwise networked, intermediary, which becomes privy to all data communication at the gateway 20. The vCPE could also be entirely hardware agnostic, to the point that regardless of the age or capabilities of any specific CPE 20 device, functionality can be provided by the vCPE that influences the manner in which the CPE device 20 interacts with the external network. For example, a firewall may be implemented at the vCPE level which the CPE or gateway 20 would then be subject to, regardless of whether or not any given CPE or gateway devices have firewall capabilities or are compatible with firewalls in general.

The software-implemented vCPE will thus be able to perform, or otherwise provide, a multitude of network functions, including but not limited to the provisioning of firewalls, port forwarding, DHCP (dynamic host configuration protocols), Quality of Service (QoS) determinations, and other standard network functions known in the art. In addition, a software-implemented vCPE as herein described may also provide advanced capabilities related to per user and/or per device data such as user/device counters, time blocking, quotas and rate shaping. A full description of various ways of implementing such a vCPE is described in applicant's prior U.S. patent application Ser. No. 14/985,012 filed Dec. 30, 2015, the contents of which are herein expressly incorporated by reference in their entirety.

The invention could also be applied to virtualizing the wireless access controllers in a community WiFi implementation, where each individual device requiring WiFi whose controllers are virtualized is analogous to the individual CPE devices in FIG. 1. More specifically, a physical gateway providing WiFi access would have a virtual counterpart to implement the virtualized functionality. In any case, communications between the physical device (i.e. the gateway) and its virtualized counterpart may be accomplished via layer 2 encapsulated traffic, such as using the L2VPN, 802.1x or MPLS.

Figure 2A:
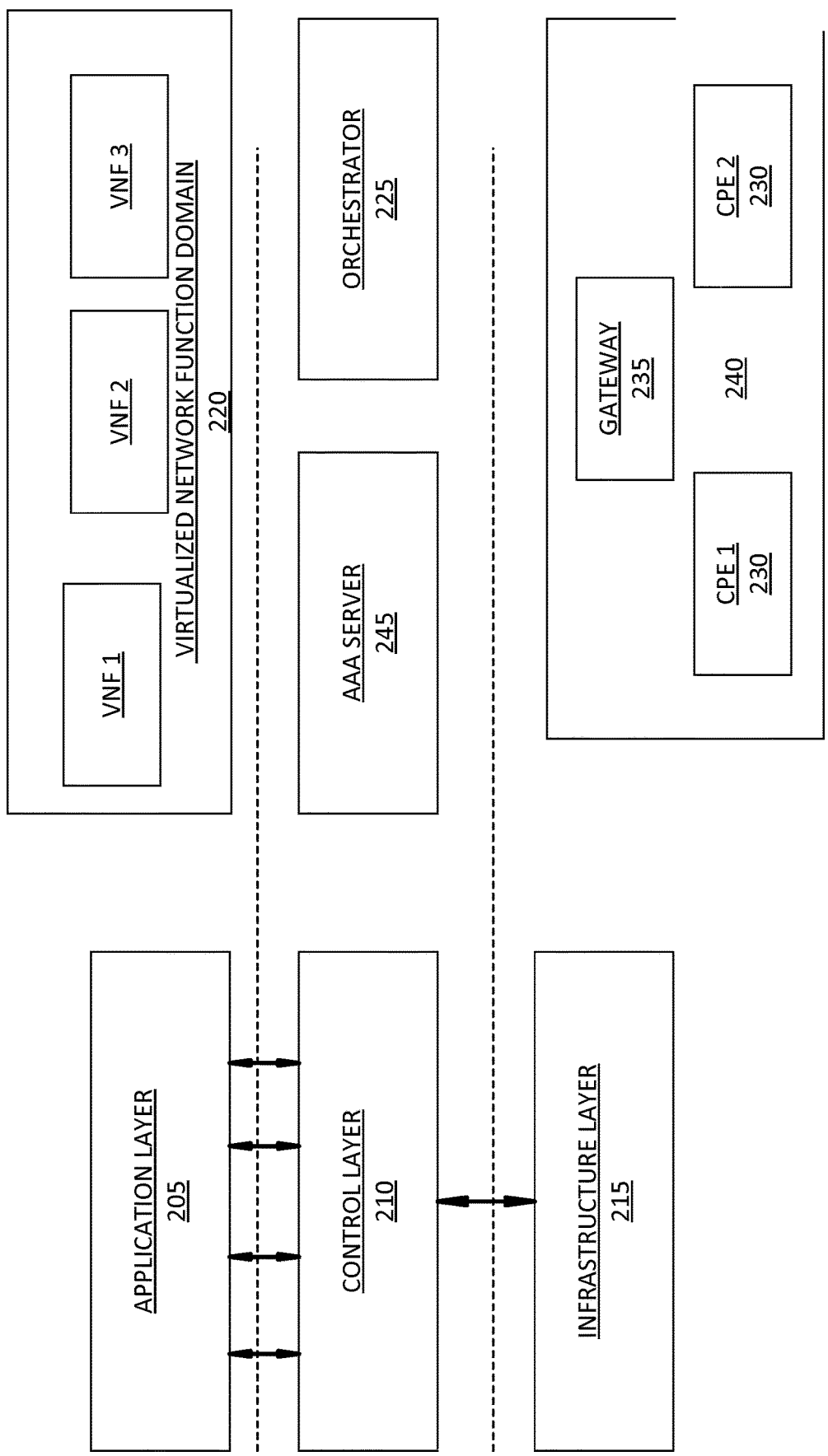
FIG. 2A shows a schematic of a system according to one embodiment of the invention.

Regardless of the specific functions being virtualized, an orchestration system is responsible for instantiating individual virtualized network functions (and data related thereto). FIG. 2A is a schematic diagram of the relationship between the hardware devices, their virtualized functions and an exemplary architecture that may be used to implement these. First, the infrastructure layer 215 maps on the hardware infrastructure 240, which includes end-user devices 230 (or any physical devices whose functions are being virtualized for that matter). Gateway 240 also forms part of the infrastructure layer, although elements of the gateway's functions could also be part of the control layer, depending on specific implementations.

The control layer 210 includes orchestrator 225 and Authentication, Authorization and Accounting (AAA) server 245. The end-user devices 230 may request authorization and data services by sending a session request to gateway 240. In turn, gateway 240 accesses AAA server 245 to authenticate the subscriber device requesting network access. In some implementations, the gateway 240 itself requires authentication (or other services of the AAA server). Once authenticated, the gateway 240 (or end-user devices 230 via gateway 240) may send subscriber data traffic elsewhere in the network, including to orchestrator 225 to request virtualization of specific network functions, that are typically otherwise carried out by gateway 240. Orchestrator 225 is preferably implemented as a software module on a hardware device, optionally part of gateway 235, but could also be a standalone computer system. The orchestrator 225 forms the control layer 210 and is responsible for chaining the services requests from the individual CPE devices for virtualized network functions to be carried out. The virtualized network function domain 220 represents the application layer and communicates with the control layer 210 or the orchestrator 225 via a series of API calls. Gateway 235 is arranged to intercept incoming and outgoing network traffic to and from each of the end-user devices to provide the virtualized functionality (as described in the aforementioned '012 patent application).

Figure 2B:
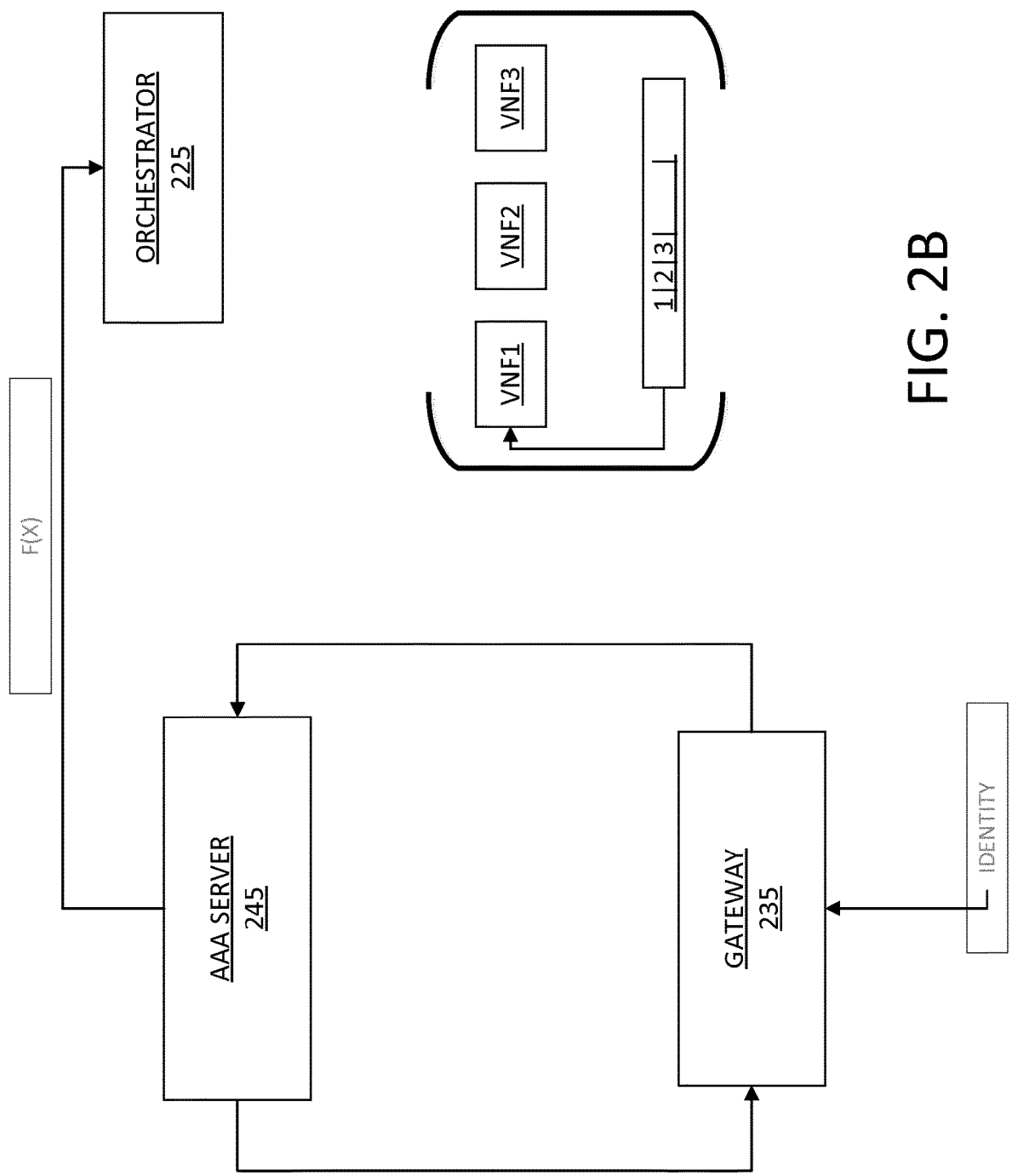
FIG. 2B shows a schematic of information flow in one embodiment of the invention.

In the present invention, as exemplified in FIG. 2B, the AAA server 245 is used (in addition to its prior art functions) as the control plane for driving virtualized network functions. In operation, the gateway 235 accesses subscriber identify information and passes this on to the AAA server 245 for authentication. The AAA server 245 responds back to the gateway 235 with certain attributes (vendor specific attributes, or VSAs, in the preferred embodiment as described further below) relevant to its required or requested virtualized network functions. Relatively contemporaneously, the AAA server 245 also communicates functions f(x) to the orchestrator 225 relevant for the virtualization of network functions, which header information consisting of the VSA data. The orchestrator 225 places the header information provided by the AAA server 245 into payload headers that are then passed on to a server executing the virtualized network function service chain. Thus, the gateway 235 has the VSH information when requesting virtualized network functions, but this information is also made available to the orchestrator 225 from the AAA server 245. The orchestrator 225 instantiates the virtualized network function service chain for the user, having received all necessary information from the AAA server 245 to place the information required by the individual VNFs into payload header data. Once the gateway 255 makes a request for a VNF from the orchestrator 255 (either directly or via the AAA server), the orchestrator will already have received the information required to instantiate the VNF from the AAA server 245 and accordingly, the orchestrator 225 does not need to communicate with the gateway to get this information, nor does it need to have been provisioned with the information beforehand. Communications between the AAA server 245 and the orchestrator 225 may be made possible by a new virtual infrastructure implemented via an API.

As a departure from the prior art, the AAA server 245 enables the provisioning of a virtualized network function by forwarding the information required for all such requests onto the orchestrator 225. The orchestrator processes these requests and manages data processing functions in the virtualized network function domain 220, typically a remote server providing the virtualized network function functionality. Various other devices implemented in hardware and/or in software may form part of the infrastructure, control and application layers as is generally otherwise known in the art. For ease of understanding though, only those pertinent to the implementation of the invention are specifically described.

AAA server 245 preferably authenticates users according to a known protocol such as the RADIUS or Diameter protocols, and most preferably, via the RADIUS protocols, both of which form part of the Internet Engineering Task Force (IETF) standards and are known in the art. These standards generally rely on header information in each data packet that contains information such as information related to the subscriber of each CPE device that permits authentication, and other services provided by the AAA server. The implementation with respect to the RADIUS protocol is discussed in detail herein.

The arrangement of FIG. 2B creates a subnetwork that is being provisioned in real-time to understand what is in header information for the execution of VNFs. When user options or inputs required for the execution of VNFs change in real time, the AAA server is configured to use its change of authorization functions to immediately alter the VSA data provided to the orchestrator, which then adds this updated information to subsequent payload data packets and are received by the VNF service chain. The orchestrator itself requires no re-provisioning, a priori information to implement this change; nor is it required to place API calls to the AAA server or to the gateway.

In the prior art, when a request for service is received at the gateway, the orchestrator would chain the processing of these services in the order received, or alternatively, based on some known a priori order based on specific customer requirements, or further alternatively by making API calls which contained rules or protocols for allocating processor and network resources. It is also known in the prior art to allocate resources based on the specific functionality being virtualized. For example VoIP traffic could be given the highest priority due to the nature and requirements of placing a VoIP telephone call. As discussed in the background, each of these approaches either place high demands on memory resources, created unnecessary latency, or are overly simplistic to the point of not being able to be fully responsive to customer preferences.

With respect to the preferred embodiment whereby the RADIUS protocol is used, communication between a network access server (NAS) or a gateway and a RADIUS server (i.e. the AAA server) is based on the User Datagram Protocol (UDP). RADIUS operates as a client/server protocol, where the client is typically the NAS (or gateway) and the server is a process running on a computer system, in this case the AAA server. The general operation of servers operating on the RADIUS protocol is known in the art, and not discussed in detail herein, except insofar as is required to understand the preferred embodiment of the invention.

Figure 3:
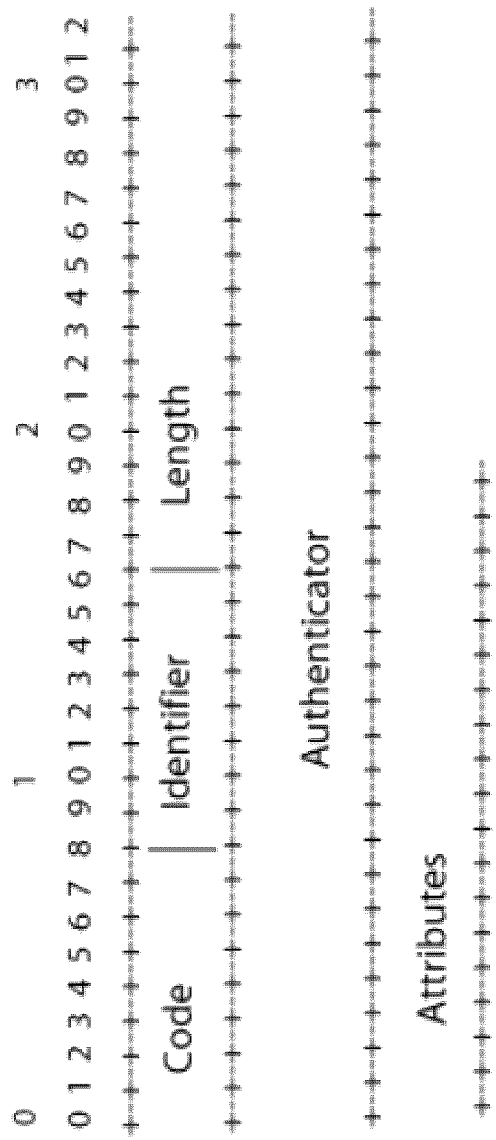
FIG. 3 shows an exemplary header data packet according to the RADIUS protocol.

FIG. 3 shows an exemplary packet format of a data payload conforming to the RADIUS protocol. The Code is normally 1 byte long and identifies the type of packet being sent. The packets related to this invention will be those, which relate to the virtualization of network functions. The Identifier is also typically 1 byte in length and is used as an aid in matching responses from the AAA server with requests sent by the gateway. The Length is generally 2 bytes long and specifies the total length of the data packet. The Authenticator is 16 bytes long and is used specifically for authentication requests. Attributes are a list of 63 attributes (as of the filing of this application) having predefined formats.

Each attribute is made up for three parts, Type, Length and Value. The Type identifies a specific attribute by a known code. The Length specifies the length of the attribute; and the Value contains information specific to that attribute. FIG. 4 shows a current list of RADIUS attribute Types.

With respect to one of the objectives of this invention, it would be helpful to provide values, which can influence or direct the processing order, control paths and specific settings of each data packet as it relates to virtualized network functions, which can be provided to the orchestrator by the AAA server, such that the orchestrator can place this information in payload headers. In this regard, RADIUS attribute 26 defines "vendor specific" attributes that permit a vendor (i.e. the operator of the virtualized network functions in this instance; or the operator of the control layer) to create an additional 255 custom attributes behind attribute 26. The preferred embodiment of the present invention provides for custom attributes to be created which contain information related to the processing order of virtualized network functions.

Figure 5:
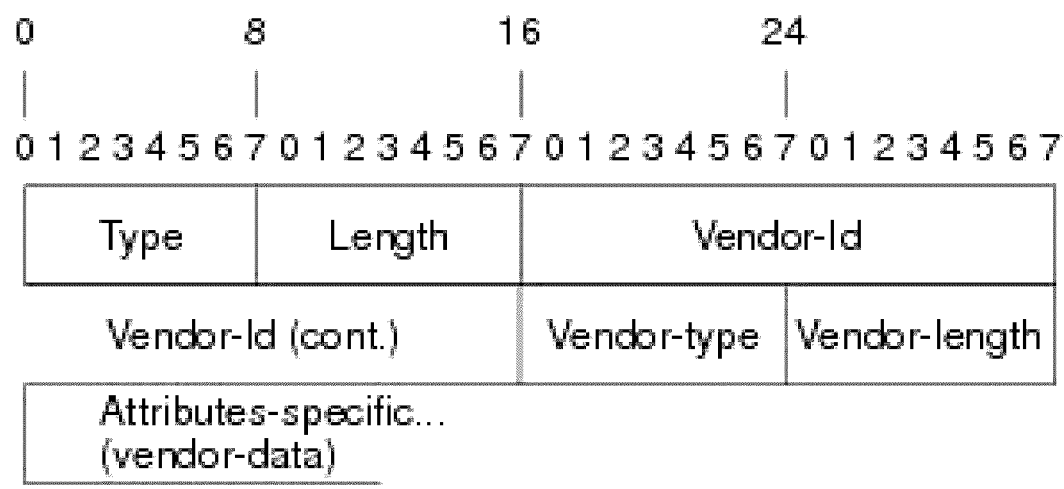
FIG. 5 is an exemplary data packet in RADIUS attribute 26.

FIG. 5 shows an exemplary packet format behind attribute 26, which would form the Value portion in FIG. 3. As shown in FIG. 5, header information is present for a Vendor-Id, which would identify the specific vendor (or in this embodiment, the vendor of the vCPE), a Vendor-type code, Vendor-length code and finally, Vendor-data. The Vendor-type and Vendor-length fields serve similar functions as the general fields of similar name in FIG. 3, except that these are defined by a given vendor for specific CPE devices. The Vendor-data field contains specific information, and it is this field will hold data relevant to influencing or directing the orchestrator.

In practice, the orchestrator will be programmed, or otherwise configured to interpret the RADIUS data, in a manner similar to how the AAA server interprets RADIUS data, but the orchestrator reads and interprets the information behind attribute 26 only. The orchestrator users this information to instantiate VNF service chains and also places relevant information into payload data headers for use when executing individual VNFs. For example, and in its simplest implementation, Vendor-type could be indicative of a specific type of virtualized network function and the Vendor-data could simply be custom parameters for that type of virtualized network function from the specific customer.

Consider the following example, where two Vendor-Ids stemming from CPE devices made by two vendors ("1111" and "2222"). Two vendors are shown for example only, but it is noteworthy that in the preferred implementation only a single vendor-ID will be available. In the example below, where the orchestrator identifies Vendor-ID 1111 behind attribute 26, it is configured to read further data behind attribute 26 which aids in the execution of virtualized network functions, as described above. The Vendor-Types include a total of 4 virtualized network functions, which are mapped onto a known set of virtualized network functions associated, either by cross-reference with a remote or locally stored database. The orchestrator identifies the virtualized network function being invoked by the Vendor-Type in the data packet, and then passes the Vendor-Data on to the application, which executes that particular virtualized network function. The information shown in the Vendor-Data column below is for illustrative purposes only, and could include any data relevant to the execution of a virtualized network function. The Vendor-Type and Vendor-Data will be placed in payload headers and used by the VNFs in the service chain during their execution.

| Vendor-ID | Vendor-Type | Vendor-Data |
|---|---|---|
| 1111 | 0001 | 5xxxxx |
| 1111 | 0002 | 2xxxxx |
| 1111 | 0003 | 1xxxxx |
| 2222 | 0001 | 1xxxxx |
| 2222 | 0002 | 5xxxxx |
| 2222 | 0003 | 3xxxxx |
| 2222 | 0004 | 2xxxxx |

Of course, more intricate and complex vendor data is likely to be implemented. Consider the following possible example, where the vendor data field includes more instructive information:

| Vendor-ID | Vendor-Type | Vendor-Data |
|---|---|---|
| 1111 | 0001 | 0001 0005 |
| 1111 | 0002 | 0002 0002 |
| 1111 | 0003 | 0004 0001 |

In this example, the vendor data contains two pieces of information related the network function being invoked. Consider the case of a quota enforcement function being virtualized. The first 4-bits could include the desire quota and the second 4-bits provide information on what action to take once the quota is hit, such as cutting off internet access, sending a warning to the gateway, etc. For greater clarity, this example is discussed for illustrative purposes only. The invention is not considered limited to any particular type of virtualized network function or data that is passed on for its execution.

In another example, a user may be able to access a web-based interface for particular functionality of their gateway. In an illustrative example, consider one where certain end users have the ability to set their quota enforcement. A user may indicate the amount of data traffic, which triggers quote enforcement and what action is to be taken once the quota is hit. The web-based interface would pass this information on to the gateway, which makes this information available to the AAA server for placing it into the header information of data packets to be executed when the quota enforcement virtualized network function is invoked.

The teachings of the invention could also be used to direct data to different virtualized network functions, where the same data payload is to be used in the execution of different network functions. The header information could contain information which directs the orchestrator on how to handle that specific data packet, which invokes more than one virtualized network function, sending it for processing by a given virtualized network function first. In the above example, quota enforcement would likely have their data packets executed by the quota enforcement network function first so to maintain a strict enforcement and count of the data quota being used prior to executing a subsequent function, which could result in the user going over quota.

These examples are shown for illustrative purposes only. Ultimately, the invention considers embedding information into the header of data packets, which would normally be used by an AAA server (or some other authentication or analogous service) to also embed information that could be used by the orchestrator to influence decisions related to the processing of virtualized network functions. The only information required by the orchestrator ahead of time is that required to interpret the header information. Accordingly, the orchestrator does not need any a priori information and does not need to communicate with any north bound OSS services in real-time, for example by way of API calls to determine how to execute the virtualized network functions based on subscriber settings.

In the example of the WiFi community project, the forwarder for the virtualized function would have payload header information on which VNF is responsible for taking the payload next. The communication happens between the supplicant NAS client (ethernet switch or tunnel termination gateway) and the AAA server. As this communication occurs over a shared secret, to have a discreet conversation, thus minimizing the risk of a man-in-the-middle attack to sniff or alter the headers. Over WiFi, the same flow applies. The NAS (hotspot gateway or the access point: bridging SSID into the hotspot controller) client has the shared secret with the AAA platform. This allows the platform to dynamically invoke the services without a priori knowledge of a subscribers and specific chained functions. The AAA platform becomes the 'source of truth' for the orchestrator, dictating the control plan for each subscriber dynamically.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

The invention claimed is:

1. A system for virtualizing network functions comprising:
   a gateway having a computer processor executing computer readable instructions for sending and receiving data traffic;

an authentication server receiving a request for authentication from said gateway based on a subscriber identity and responding to said gateway; said response including data to influence the execution of discrete virtualized network functions without requiring a priori knowledge of individual customer virtualized network function requirements;

an orchestration server including a computer processor for receiving service requests for virtualized functions from said gateway and invoking at least one requested virtualized function;

said authentication server providing data to said orchestration server relevant to the instantiating of said virtualized network functions and data relevant to the execution of said virtualized network functions;

said orchestration server placing said data received from said authentication server into headers of payload data from said gateway such that said payload data contains information required by a virtualized network function server for executing said virtualized network functions based on said instantiating by the orchestration server.

2. The system according to claim 1, wherein said authentication server receives data associating subscriber identify with said gateway; wherein said data packets having said header portion conform to a protocol.

3. The system according to claim 2, wherein said protocol includes data attributes in the form of a Network Service Header (NSH) that include information used in the forwarding domain to implicitly define the service chain applied against the payload when executing said invoked virtualized network functions.

4. The system according to claim 3, wherein said protocol is the RADIUS protocol, and said data fields are behind vendor-defined attribute 26 as Vendor Specific Headers (VSH).

5. The system according to claim 2, wherein said authentication server is an authentication, authorization and accounting (AAA) server.

6. The system according to claim 1, wherein said virtualized network functions are functions required by said subscriber, regardless of the gateway.

7. The system according to claim 1, wherein said gateway is a network access point for providing internet service.

8. The system according to claim 2, wherein said orchestration service has no a priori knowledge regarding the subscriber VNF service chain; and thereby routes the payload through said virtualized network functions entirely based on information in said header portion of said data packets.

9. The system according to claim 8, wherein said information relevant to the execution of said virtualized network functions is passed on to said virtualized network function server as being relevant only to said invoked virtualized network function.

10. The system according to claim 4, wherein said orchestration service reacts to the AAA service authentication of a user and associated identifying attributes selected from circuit ID, MAC and IMSI where the user is routing traffic through, and communicate with the orchestration service to insatiate VNFs based on the vendor-defined attributes 26.

11. A method for virtualizing network functions comprising:

receiving by an orchestration server service requests for virtualized network functions from a gateway and invoking at least one requested virtualized function;

executing by a virtualized network function server discrete virtualized functions based on said invoking by the orchestration server without requiring a priori knowledge of individual customer virtualized network function requirements;

executing by an authentication platform of vendor specific attributes to influence the values of service chain inheritance per subscriber identity;

wherein data packets in said service requests include a header portion; said header portion including information processed by said authentication platform for inserting each subscriber network service header value to forward payloads to said virtualized network functions.

12. The method according to claim 11, further comprising receiving by an authentication server data associating subscriber identify with said gateway; wherein said data packets having said header portion conform to a protocol used by said service chain forwarding.

13. The method according to claim 12, wherein said protocol includes data attributes in the form of a Network Service Header (NSH) that include information used in the forwarding domain to implicitly define the service chain applied against the payload when executing said invoked virtualized network functions.

14. The method according to claim 13, wherein said protocol is the RADIUS protocol, and said data fields are behind vendor-defined attribute 26 as Vendor Specific Headers (VSH).

15. The method according to claim 12, wherein said authentication server is an authentication, authorization and accounting (AAA) server.

16. The method according to claim 11, wherein said virtualized network functions are functions required by said subscriber, regardless of gateway.

17. The method according to claim 11, wherein said gateway is a network access point for providing internet service.

18. The method according to claim 12, wherein said orchestration service has no a priori knowledge regarding the subscriber VNF service chain; and thereby routes the payload through said virtualized network functions entirely based on information in said header portion of said data packets.

19. The method according to claim 18, wherein said information relevant to the execution of said virtualized network functions is passed on to said virtualized network function server as being relevant only to said invoked virtualized network function.

20. The method according to claim 14, wherein said orchestration service will react to the AAA service authentication of a user and associated identifying attributes such as circuit ID, MAC, IMSI where the user is routing traffic through, and communicate with the orchestration service to insatiate as needed any generic or custom VNFs based on the vendor-defined attributes 26.

* * * * *